US012597815B2

(12) United States Patent (10) Patent No.: US 12,597,815 B2
Fratila et al. (45) Date of Patent: Apr. 7, 2026

(54) ROTOR FOR A ROTARY ELECTRIC MACHINE

(71) Applicant: NIDEC PSA EMOTORS, Carrieres Sous Poissy (FR)

(72) Inventors: Radu Fratila, Antony (FR); Sara Bazhar, Bois d'Arcy (FR); Mohand Ou Ramdane Hamiti, Montigny le Bretonneux (FR)

(73) Assignee: Nidec PSA Emotors, Carrieres sous Poissy (FR)

( * ) Notice: Subject to any disclaimer, the term of this patent is extended or adjusted under 35 U.S.C. 154(b) by 228 days.

(21) Appl. No.: 18/264,353

(22) PCT Filed: Jan. 26, 2022

(86) PCT No.: PCT/FR2022/050136
§ 371 (c)(1),
(2) Date: Aug. 4, 2023

(87) PCT Pub. No.: WO2022/175614
PCT Pub. Date: Aug. 25, 2022

(65) Prior Publication Data
US 2024/0120785 A1 Apr. 11, 2024

(30) Foreign Application Priority Data
Feb. 22, 2021 (FR) ...................................... 2101695

(51) Int. Cl.
*H02K 1/276* (2022.01)
(52) U.S. Cl.
CPC ................................... *H02K 1/276* (2013.01)

(58) Field of Classification Search
CPC ... H02K 1/276; H02K 1/2766; H02K 2213/03
(Continued)

(56) References Cited

U.S. PATENT DOCUMENTS

2007/0096577 A1   5/2007   Guven et al.
2007/0096578 A1   5/2007   Jahns et al.
(Continued)

FOREIGN PATENT DOCUMENTS

CN            206650521 U     11/2017
CN            110212666 A      9/2019
(Continued)

OTHER PUBLICATIONS

International Search Report for PCT/FR2022/050136 mailed May 18, 2022.
Written Opinion for PCT/FR2022/050136 mailed May 18, 2022.

*Primary Examiner* — Alex W Mok
(74) *Attorney, Agent, or Firm* — Sandberg Phoenix & von Gontard, PC

(57) ABSTRACT

Rotor (30) for a rotary electric machine, comprising a rotor body (33) comprising metal sheets stacked one on top of the other, the rotor body (33) comprising a plurality of housings (10) for receiving one or more permanent magnets defining poles of the rotor, the housings of a pole being arranged in at least one first (11) and one second (12) row of housings, the first row of housings comprising three U-shaped housings, with a central housing and two side housings, a length (L2) of a larger rectangle enclosed in the central housing being equal to +/−20% of the length (L1) of the largest rectangle enclosed in a side housing, at least one of the side housings, in particular the two side housings of the first row, comprising a recess (15) which extends from the side housing to the central housing.

18 Claims, 7 Drawing Sheets

(58) Field of Classification Search
USPC .................................................... 310/156.56
See application file for complete search history.

(56) References Cited

U.S. PATENT DOCUMENTS

| | | |
|---|---|---|
| 2008/0007131 A1 | 1/2008 | Cai et al. |
| 2010/0079026 A1 | 4/2010 | Han et al. |
| 2013/0020889 A1 | 1/2013 | Yamamoto et al. |
| 2015/0229170 A1* | 8/2015 | Koechlin ............. H02K 1/2766<br>310/156.53 |
| 2018/0241262 A1* | 8/2018 | Tang .................... H02K 21/145 |
| 2019/0214862 A1* | 7/2019 | Hoemann ................ H02K 1/12 |
| 2020/0395796 A1 | 12/2020 | Kim et al. |

FOREIGN PATENT DOCUMENTS

| | | |
|---|---|---|
| FR | 3094583 B1 | 3/2021 |
| KR | 10-2018229 B1 | 9/2019 |
| TW | I589097 B | 6/2017 |
| WO | 2019174323 A1 | 9/2019 |
| WO | 2019179864 A1 | 9/2019 |
| WO | 2020090152 A1 | 5/2020 |

* cited by examiner

ROTOR FOR A ROTARY ELECTRIC MACHINE

CROSS-REFERENCE TO RELATED APPLICATIONS

This application is the US National Stage under 35 USC § 371 of International Application No. PCT/FR2022/050136, filed Jan. 26, 2022, which claims the priority of French application 2101695 filed on Feb. 22, 2021, the content (text, drawings and claims) of both said applications being incorporated by reference herein.

BACKGROUND

The devices described herein relate to rotary electric machines, motors or generators, and more particularly to the rotors for such machines, as well as to permanent-magnet rotors.

More particularly, synchronous or asynchronous AC machines are described. In particular, traction or drive machines for electric motor vehicles (Battery Electric Vehicles) and/or hybrid motor vehicles (Hybrid Electric Vehicles—Plug-in Hybrid Electric Vehicles), such as private cars, vans, trucks or buses are described. The described devices also apply to rotary electric machines for industrial and/or power generation applications, in particular naval, aerospace or wind turbine applications.

Permanent-magnet rotors are generally composed of a rotor body and of permanent magnets of various geometric shapes. The rotor body may comprise a stack of cut, thin magnetic laminations. It may comprise one or more stacks of laminations stacked one on top of the other.

The permanent magnets may be arranged on the surface, directly facing the air gap or, alternatively, be arranged inside the rotor body, in recesses therein, then being said to be "buried" or "embedded."

In this case, they can be arranged in a row, such as for example in the US application 2007/0096578, wherein the recesses of the magnets have half-circle rounded ends, as well as in the US application 2007/0096577.

In applications CN110212666, US 2013/0020889 and CN206650521, there is a permanent magnet arranged on the surface and a single row of buried magnets.

In applications US 2008/007131, WO2019/179864 and KR10-2018229, the permanent magnets of the two rows are arranged in a V.

In application WO 2019/174323, the rows are arranged such that two adjacent magnets of two consecutive poles are parallel to one another and two magnets of two rows are also parallel to one another.

There is a need to improve the magnetic performance and in particular the torque density of the rotary electric machines, and to reduce their manufacturing and assembly cost.

SUMMARY

An object of the devices described herein is, according to one of its aspects, a rotor of a rotary electric machine, a rotor body comprising laminations stacked on one another, the rotor body having a plurality of recesses, at least part of the recesses, or even all the recesses, accommodating one or more permanent magnets defining poles of the rotor, the recesses of a pole being arranged in at least a first and a second row of recesses, the first row of recesses comprising three recesses arranged in a U, with a central recess and two side recesses, a length of a larger rectangle enclosed in the central recess being equal to +/−20% of the length of the largest rectangle enclosed in a side recess, at least one of the side recesses, in particular the two side recesses of the first row, comprising a notch that extends from the side recess toward the central recess.

Advantageously, the presence of two rows of recesses allows an increase in the number of magnets accommodated in the rotor body, and thus an increase in the resulting power density. It is thus possible to obtain more torque with the same rotor space. The described device advantageously allows improvement of the reluctance torque of the machine.

The "length" is measured along the axis of the row of recesses. "Width" is referred to in order to designate the dimension perpendicular to the length in the plane of a cross section of the rotor body.

The length of the largest rectangle enclosed in the central recess may be equal to +/−20% of the length of the largest rectangle enclosed in a side recess, or even +/−17%, preferably +/−15%, or even +/−10%, even more preferably +/−7%, or even +/−5%. In this ratio, reference is made to the length of the largest rectangle enclosed in a side recess.

In one embodiment, the length of a magnet of the second row may be equal to the length of a magnet of the first row. All of the magnets of a pole may have the same length.

In one embodiment, the rotor comprises a first and a second row of recesses per pole, and is devoid of any additional row.

The second row may be closer to the air gap than the first row. The first row is further away from the air gap than the second row.

The first row may comprise a central recess and two side recesses. The two side recesses are symmetrical to one another relative to an axis of the pole.

The rotor body may comprise one or more stacks of laminations stacked one on top of the other. Each stack of laminations may comprise at least one recess accommodating the permanent magnet. In the case where the rotor body comprises multiple stacks of laminations, the rotor body may comprise, for one and the same recess, one or more permanent magnets, for example one permanent magnet per stack of laminations.

The width of the largest rectangle enclosed in the central recess may be equal to +/−50% of the width of the largest rectangle enclosed in a side recess, preferably 40%, more preferably 30%, or even +/−20%, more preferably +/−15%, or even +/−10%, more preferably +/−7%, or even +/−5%. In this ratio, reference is made to the width of the largest rectangle enclosed in a side recess.

The width B of the central recess may be equal to the width B of a side recess.

The width A of a recess of the second row may be less than the width B of a recess of the first row. A ratio (B-A)/B may be between 0% and 40%, preferably between 5 and 35%, or between 10 and 30%, for example of the order of 25%. In one embodiment, it is possible to have the width B of a recess of the first row equal to 3.7 mm and the width A of a recess of the second row equal to 2.8 mm.

In one embodiment, the width A of a recess of the second row may be equal to the width B of a recess of the first row. All the recesses of a pole may have the same width A.

The number of permanent magnet sizes necessary may advantageously be reduced to at most two or three, or even only be one.

The side recesses of the first row may be provided with permanent magnets. The permanent magnets of the side recesses of the first row may be identical to one another. They may in particular have the same size in cross section.

The central recess of the first row may be provided with one or more permanent magnets, or alternatively may be devoid thereof. Depending on the choice of the presence or absence of a central permanent magnet, the rotor may advantageously allow a certain modularity for the resulting machine.

The central recess of the first row may be provided with a permanent magnet of the same size as the permanent magnets of the side recesses.

Alternatively, the central recess of the first row may be provided with a permanent magnet which is smaller than the permanent magnets of the side recesses. This is advantageous from an electromagnetic point of view. Indeed, since the permanent magnet is smaller than the recess, there is a part of the recess that is empty on the sides of the magnet, and the empty part allows electromagnetic leakage to be reduced.

In another alternative embodiment, the central recess of the first row is empty.

The recesses of the second row may be arranged in a V-shape. The second row may in particular comprise two recesses arranged in a V. They may be symmetrical to one another relative to an axis of the pole. In one embodiment, all the recesses in the second row are provided with permanent magnets. The V-shaped configuration of the second row makes it possible to save space, and to avoid any risk of saturation of the magnetic circuit.

In another alternative embodiment, the recesses of the second row are empty, with no magnets.

The permanent magnets of the second row may be identical to one another. They may in particular have the same size in cross section. The permanent magnets of the second row may have a different size from the permanent magnets of the first row, for example smaller.

An angular opening α3 of the second row may be greater than or equal to twice the sum of the angular opening α1 between two consecutive poles and the angular opening α2 between the first and second rows. It can be written α3≥2 (α1 +α2). The angular openings are measured at the surface of the rotor, at the air gap, for a given pole of the rotor.

An angular opening α3 of the second row may be given by the following relationship: α3=k2π/(2p), where p is the number of pairs of poles of the rotor and k is the polar opening coefficient, with the polar opening coefficient k being comprised in the interval [22.5%;37.5%], preferably in the interval [25%; 35%]

The choice of the value of the polar opening coefficient k allows optimization of the resulting torque. In one embodiment, k is equal to 34.6%.

An angle α4 between the adjacent recesses of two consecutive poles may be strictly greater than 0, in particular between 5° and 35°, preferably between 12° and 30°, for example, 24.8° in one embodiment. A strictly positive angle α4 allows the cogging torque to be increased. The choice of the value of the angle α4 allows improvement of the resulting torque.

The angle α4 may in particular be less than 55°, preferably 50°, more preferably 40°, in particular less than 35°. The two adjacent recesses considered for the measurement of the angle α4 between the two consecutive poles are recesses of the first row.

Each side recess of the first row forming a material bridge with the central recess, the two material bridges each having a longitudinal axis, the two axes being parallel to one another. This makes it possible to improve the mechanical strength and to obtain better mechanical behavior in order to withstand centrifugal force.

The axes of the material bridges may be parallel to an axis of the rotor pole.

The notch may be configured to protrude radially beyond the central recess. The notch may protrude radially beyond the central recess by a distance Y comprised between 0 mm and twice the width of the central recess. This protrusion may allow the path of the magnetic flux to be increased, which allows flow leaks to be reduced. It thus allows increased reluctance, since the path of the flux is extended while reducing the leakage flow.

The radial protrusion of the notch of the first row of recesses may advantageously be associated with material bridges between the side recesses and the central recess which may be straight. The material bridges between the side recesses and the central recess may in particular extend along an axis which may be rectilinear. The two axes of the two material bridges of the first row may be parallel to one another. They may extend substantially radially. These axes may be parallel to the edges of the central recess. Such a configuration may make it possible to reduce the leakage flows and thus increase the electromotive force, as well as to increase the reluctance of the magnetic circuit and the torque, while increasing the mechanical strength of the material bridges. The torque may for example be increased by 200 rpm.

A width X of the notch may be between 0 mm and twice the width B of the central recess. The length Z of the notch may be between once the width B of the central recess and twice the latter.

These dimensions determine the size of the material bridge between the side recesses and the central recess. This material bridge has a minimum width conditioned by the mechanical strength constraints. Its width is substantially equal to at least the thickness of the magnetic lamination.

A radial dimension W between the bottom of the second row and the first row may be between once the width B of the central recess and three times said width.

The notch may have an edge that extends at least partially parallel to an edge of the central recess.

At least one recess may comprise at least one stop for holding the permanent magnet intended to be accommodated in the recess. Each recess may comprise a stop located toward the air gap.

The recesses are each separated from the air gap by a material bridge whose width is conditioned by the mechanical strength constraints. Their width is substantially equal to at least the thickness of the magnetic lamination. The length of these bridges is substantially equal to the width of the recesses.

The side recesses may also comprise a stop situated toward the notch, for holding the permanent magnet.

The rotor may be devoid of cooling fluid circulation in the recesses. In particular, the notches are not configured to allow the circulation of a cooling fluid.

The described devices also relate, independently or in combination with the foregoing, to a rotor for a rotary electric machine, comprising a rotor body comprising laminations stacked on one another, the rotor body having a plurality of recesses, at least part of the recesses, or even all the recesses, accommodating one or more permanent magnets defining poles of the rotor, the recesses of a pole being arranged in at least a first and a second row of recesses, the first row of recesses comprising three recesses arranged in a U, with a central recess and two side recesses, a length L2 of a larger rectangle enclosed in the central recess being equal to +/−20% of the length L1 of the largest rectangle enclosed in a side recess, at least one of the side recesses, in particular the two side recesses of the first row, comprising a notch that extends from the side recess toward the central recess, each side recess of the first row forming a material bridge with the central recess, the two material bridges each having a longitudinal axis, the two axes being parallel to one another.

Twisted Rotor

In one embodiment, the rotor body of the rotor may be composed of a plurality of stacks consecutively arranged along an axis of rotation of the rotor, two consecutive stacks being angularly offset about the axis of rotation of the rotor by an elementary angle θr.

The rotor may in particular comprise a first stack of laminations and a second stack of laminations.

Such a rotor is said to be "twisted." The rotor may advantageously be twisted in particular in the case where the stator comprises a full-pitch winding. The device may allow reduction of the number of stacks required for the rotor. When the rotor is twisted, the reduction of the torque waves may be further improved.

Alternatively, the rotor may not be twisted. This is referred to as a "straight" rotor. The rotor may advantageously be straight in particular in the case where the stator comprises a fractional-pitch winding.

Rotor Indentations

At least one of the laminations of the rotor body may comprise a plurality of indentations on the surface of the rotor body facing the air gap.

The indentations of the rotor may all be identical or different. They may differ for example by their size and/or their shape. The indentations of the rotor may be provided facing the air gap, at the surface of the rotor or slightly buried.

The rotor indentations may be identical to or different from the stator indentations.

At least one rotor indentation may have a shape, in the plane of the lamination, selected from the following list, which is not limiting: partially circular, semi-circular, oblong, partially elliptical, polygonal, square, rectangular, rectangular with or without rounded corners, triangular, trapezium-shaped, dovetail-shaped, V- or W-shaped.

In the case where the indentation comprises a partially circular portion, for example semi-circular, its radius of curvature may be between 0.1 and 4 mm, preferably between 0.36 and 3 mm, or between 0.63 and 2 mm, for example of the order of 0.36 mm or 0.4 mm or 0.6 mm or 0.63 mm or 0.8 mm or 0.9 mm or 1 mm or 1.2 mm or 1.26 mm or 1.4 mm or 1.6 mm or 1.8 mm.

The radius of curvature of a rounded corner may be less than half the width of an indentation, measured circumferentially in the plane of the lamination. The radius of curvature of a rounded corner may be less than or equal to at least half of the width $a_r$ of an indentation and its depth $b_r$, measured radially in the plane of the lamination, namely min ($b_r$, $a_r/2$).

At least one indentation of the rotor may comprise a partially circular or even semi-circular portion, its radius of curvature R being between 0.4 e and 8 e, preferably between 0.7 e and 4 e, for example of the order of e, where e denotes the width of the air gap of the machine comprising the stator.

At least one indentation of the rotor may have a depth $b_r$, measured radially in the plane of the lamination, less than its width $a_r$, measured circumferentially in the plane of the lamination.

As a variant, the depth, measured radially in the plane of the lamination, may be greater than the width of the indentation of the rotor, measured circumferentially in the plane of the lamination.

The indentations of the laminations of a first stack of the rotor body may be angularly offset relative to the indentations of the laminations of a second stack of the rotor body.

The rotor body may comprise at least two stacks of laminations, or even at least three or four stacks. It may for example comprise two, three or four stacks of laminations. The first and second stacks of laminations may be consecutive.

The laminations of a stack of rotor laminations may all be identical to one another.

The laminations of each stack of rotor laminations may be identical between laminations of said stack.

The laminations of two different stacks may be identical to one another, being angularly offset or being turned over so as to obtain the angular offset of the indentations. The laminations of two different stacks may be identical to one another, not being turned over. The two stacks with identical laminations may or may not be consecutive. They may for example be separated by a stack of laminations having different laminations.

The term "identical laminations" is understood to mean that said laminations are identical by the position of the indentation(s).

Alternatively, the laminations of two different stacks may be different from one another, the indentation(s) not being placed in the same manner or being able to have a different shape or size, or the number of indentations being different.

"Different laminations" is mainly understood to mean that said laminations differ from one another by the position of the indentation(s) or by the number of indentations.

In one embodiment, two laminations may comprise a different number of indentations.

In one embodiment, the indentations are offset relative to a longitudinal axis of the rotor pole, which may be an axis of symmetry for the pole, an offset angle. The laminations may in particular differ from one another by the value of the offset angle. The offset angle may be different between a lamination of the first stack and a lamination of the second stack.

The angular offset of the indentations of two stacks of the rotor may form a design with a regular or irregular offset, always in the same direction, or with a change of direction, for example in chevrons, in V, in W, in a zigzag.

Alternatively, the rotor may have no indentations on the surface of the rotor body. The surface of the rotor body may be substantially smooth.

Machine

Another object is a rotary electric machine, comprising a stator and a rotor as defined hereinbefore.

The machine may be used as a motor or as a generator. The machine may be a reluctance machine. It may be a synchronous motor or, alternatively, a synchronous generator. Alternatively still, it is an asynchronous machine.

The maximum speed of rotation of the machine may be high, for example greater than 10,000 rpm, preferably 12,000 rpm, for example of the order of 14,000 rpm to 15,000 rpm, or even 20.000 rpm or 24,000 rpm or 25,000 rpm. The maximum rotational speed of the machine may be lower than 100,000 rpm, or lower than 60,000 rpm, or even lower than 40,000 rpm, and preferably lower than 30,000 rpm.

The device may be most particularly suitable for high-power machines.

The machine may include a single inner rotor or, alternatively, an inner rotor and an outer rotor, which are arranged radially on either side of the stator and are rotationally coupled.

The machine can operate alone or be coupled to a gearbox. In this case, it is placed in a casing that also houses a gearbox.

The machine includes a stator. The stator includes teeth which define slots between them. The stator may include electrical conductors, and at least some of the electrical conductors, or even most of the electrical conductors, may be in the form of U- or I-shaped pins. Alternatively, the electrical conductors may include round wire.

The stator may be star-connected or delta-connected.

The machine may comprise a number of poles between 2 and 48, preferably between 4 and 24, or even between 6 and 12, for example, 6 or 8.

Another subject is a method for producing a rotor for a rotary electric machine as defined hereinbefore.

The method may comprise the step of longitudinally inserting, along the axis of rotation of the rotor, at least one permanent magnet into the recess.

In the case where the rotor body comprises multiple stacks of laminations stacked one on top of the other, the method may first comprise the step of longitudinally inserting at least one permanent magnet into the recess of each stack of laminations, then the step of stacking the stacks of laminations one on top of the other, with the permanent magnets in the recesses.

BRIEF DESCRIPTION OF THE FIGURES

FIG. 7b is a view similar to FIG. 1 of another lamination of the alternative of FIG. 7a.

DETAILED DESCRIPTION

Figure 1:
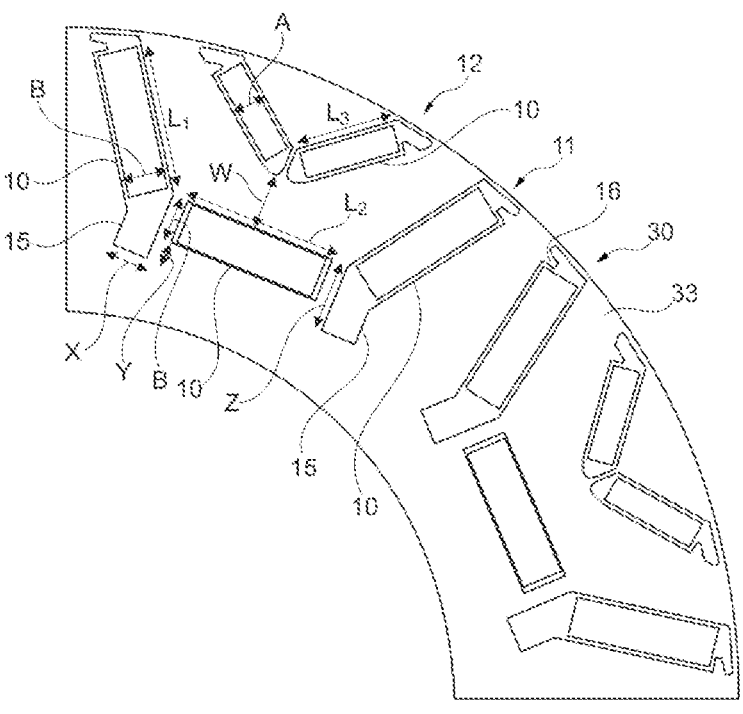
FIG. 1 is a schematic and partial view, in cross section, of a rotor for a rotary electric machine.
Figure 2:
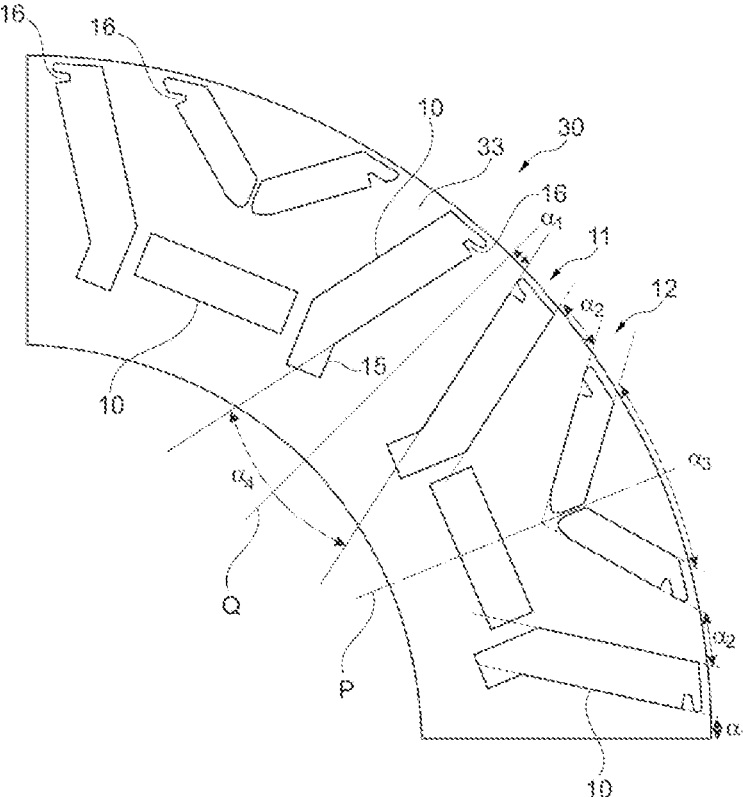
FIG. 2 is a view similar to FIG. 1 but without the permanent magnets.
Figure 3:
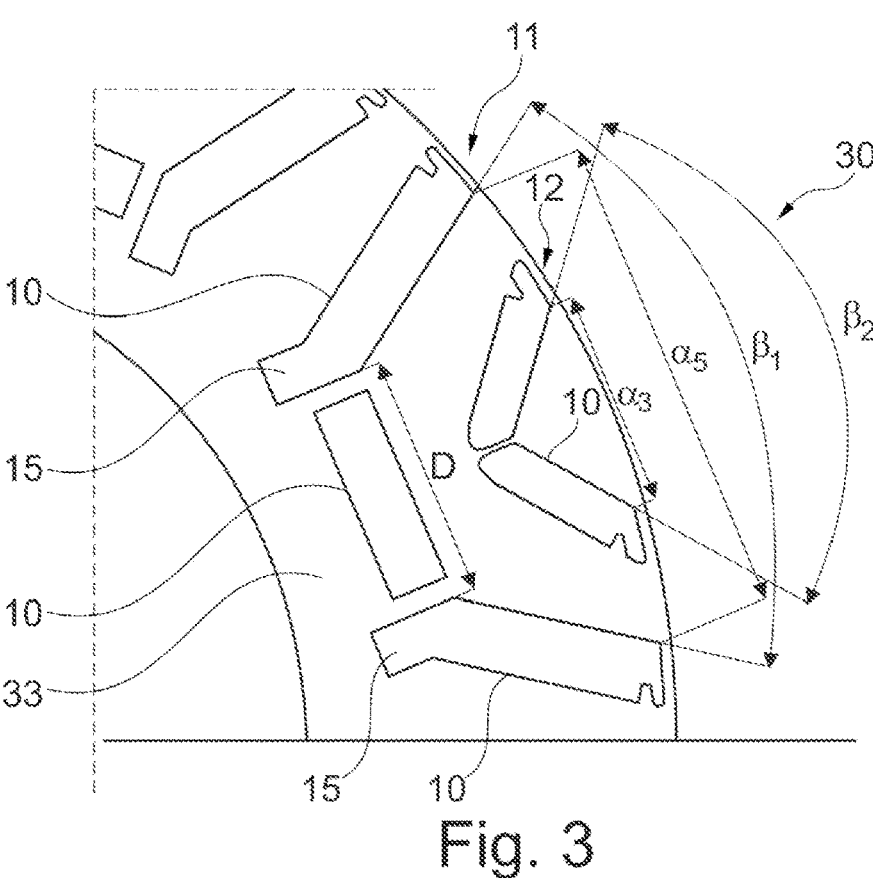
FIG. 3 is a view similar to FIG. 1.

FIGS. 1 to 3 show a rotor 30 for a rotary electric machine, comprising a rotor body 33 wherein recesses 10 are formed. Permanent magnets are inserted into each of the recesses 10, so as to define poles of the rotor. This rotor is intended to be associated with a stator, not shown.

Figure 5:
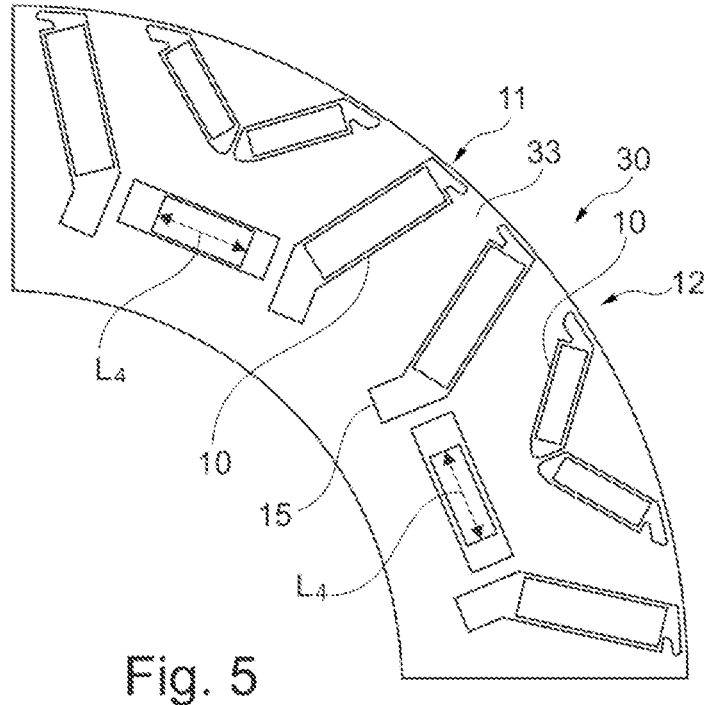
FIG. 5 is a view similar to FIG. 1 of an alternative embodiment.
Figure 6:
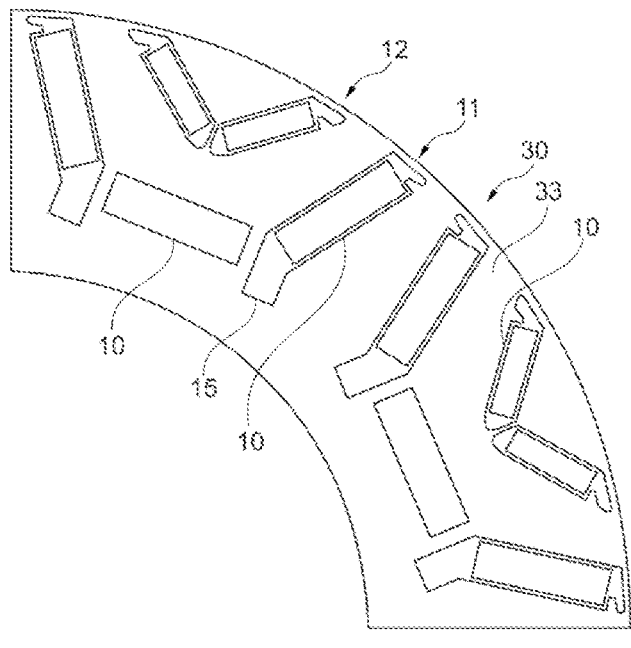
FIG. 6 is a view similar to FIG. 1 of an alternative embodiment.

In this example, the magnets are generally rectangular in cross section as shown in the embodiments of FIGS. 1, 5 and 6. Each magnet has, in cross section, both a first long side and a second long side, opposite the first, and a first short side and a second short side, opposite the first. Each recess 10 is delimited by two faces that face the first long side and the second long side of the magnet, respectively.

The recesses 10 of a pole are arranged in a first row 11 of recesses further away from the air gap and a second row 12 of recesses closer to the air gap.

The first row 11 of recesses 10 comprises three recesses 10 arranged in a U shape, with a central recess and two side recesses which are symmetrical to one another relative to an axis of the pole P.

In the described example, a length L2 of a larger rectangle enclosed in the central recess is equal to the length L1 of the largest rectangle enclosed in a side recess. The "length" is measured along the axis of the row of recesses. The length L3 is designated as the length of a larger rectangle enclosed in a recess of the second row.

The width B of the largest rectangle enclosed in the central recess is equal to the width B of the largest rectangle enclosed in a side recess. "Width" is referred to in order to designate the dimension perpendicular to the length in the plane of a cross section of the rotor body.

The side recesses of the first row 11 are provided with permanent magnets, as is the central recess. The permanent magnets of the side recesses and of the central recess of the first row 11 are identical to one another. They in particular have the same size in cross section.

Each side recess of the first row forms a material bridge with the central recess, the two material bridges each having a longitudinal axis, the two axes being parallel to one another.

Furthermore, the two side recesses of the first row 11 comprise a notch 15 that extends from the side recess to the central recess. The notch 15 is configured to protrude radially beyond the central recess by a distance Y. The notch 15 has a width X and a length Z.

Furthermore, the notch 15 has an edge that extends at least partially parallel to an edge of the central recess.

The second row 12 comprises two recesses arranged in a V. They are symmetrical to one another relative to an axis of the pole P. In the example described, all the recesses of the second row 12 are provided with permanent magnets. The permanent magnets of the second row are identical to one another. They in particular have the same size in cross section. Conversely, the permanent magnets of the second row have a different size from the permanent magnets of the first row, being smaller. The width A of a recess of the second row is less than the width B of a recess of the first row.

A radial dimension W between the bottom of the second row and the first row may be between once the width B of the central recess and three times said width.

The side recesses of the first row 11 as well as the recesses of the second row 12 comprise at least one stop 16 for holding the permanent magnet intended to be accommodated in the recess, this stop 16 being located toward the air gap.

The angular opening $\alpha 3$ of the second row 12 is defined. This angular opening $\alpha 3$ is greater than twice the sum of the angular opening $\alpha 1$ between two consecutive poles and the angular opening $\alpha 2$ between the first and second rows. It can be written $\alpha 3 \geq 2 (\alpha 1 + \alpha 2)$. In the example described, $\alpha 3 = 1$, 2*2 ($\alpha1$ +$\alpha2$). The angular openings are measured at the rotor surface, at the air gap, for a given pole of the rotor, as shown in FIG. 2.

Moreover, the angular opening $\alpha3$ of the second row may be defined by the following relationship: $\alpha3=k2\pi/(2p)$, where p is the number of pairs of poles of the rotor, which is 4 in the described example, and k is the polar opening coefficient, which is equal to 34.6%.

An angle $\alpha4$ between the adjacent recesses 10 of two consecutive poles is 24.8° in the example described. The two adjacent recesses considered for the measurement of the angle $\alpha4$ between the two consecutive poles are recesses of the first row.

As an example, reference is made to FIG. 3 for the angle and angular openings values. The side magnets of the first row 11 form an angle (31 of about 70° relative to one another. The magnets of the second row 12 form an angle 132 of about 103° relative to one another.

The angular opening $\alpha3$ of the second row 12 is about 13 mm. The angular opening $\alpha5$ of the first row 11 is about 30 mm.

Finally, a gap D between the two notches of the side recesses of the first row 11 is about 15 mm.

Of course, the shapes of the recesses 10 and notches 15 could vary without departing from the scope of the present disclosure. As an example, FIGS. 4a to 4d show alternative embodiments.

Figure 4A:
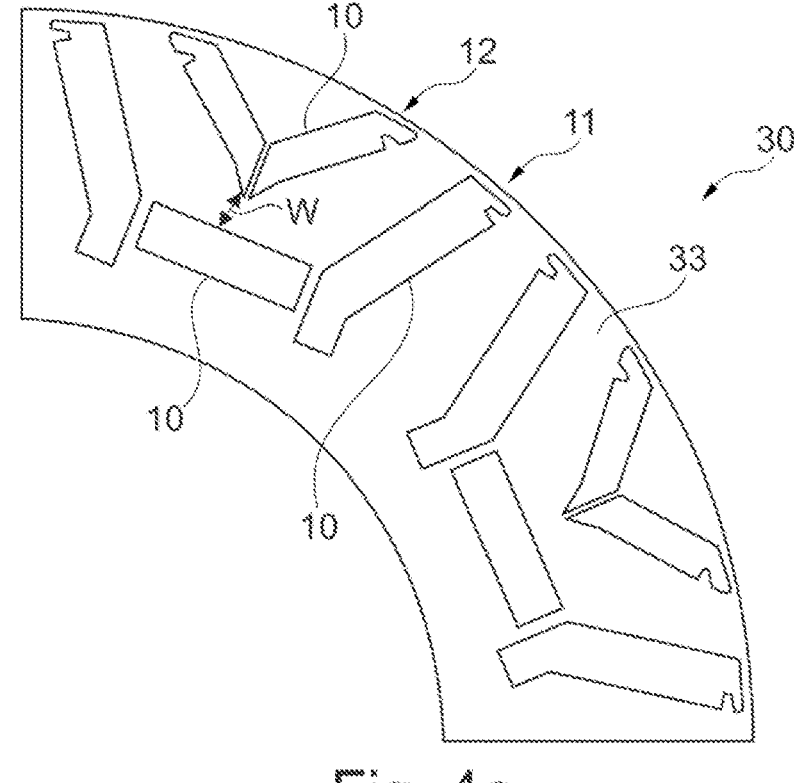
FIG. 4a is a view similar to FIG. 2 of an alternative embodiment.

In the example of FIG. 4a, the recesses of the second row 12 are elongated at the tip so as to reduce the distance W between the bottom of the second row and the first row.

Figure 4B:
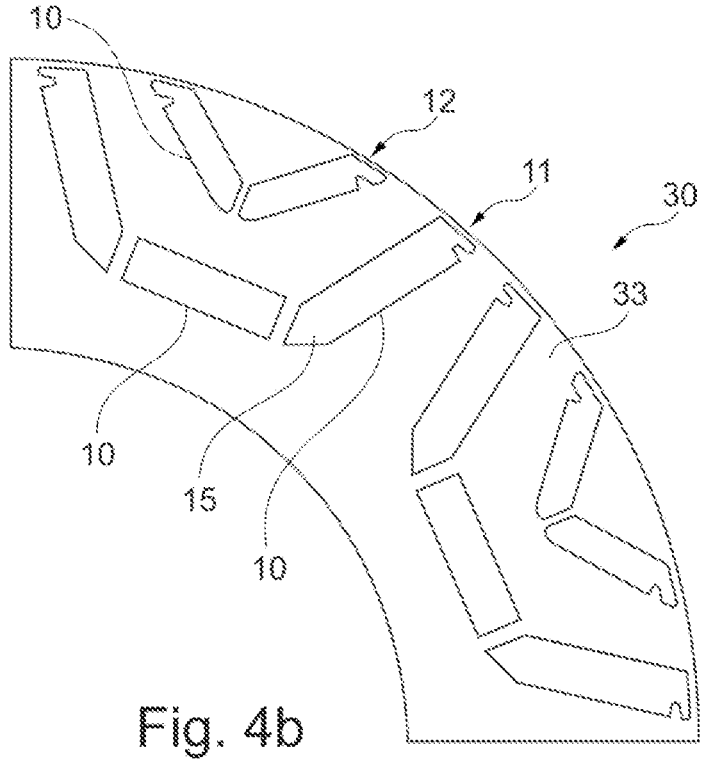
FIG. 4b is a view similar to FIG. 2 of an alternative embodiment.

In the example of FIG. 4b, the notches 15 of the recesses of the first row 12 are shortened, not protruding radially from the central recess.

Figure 4C:
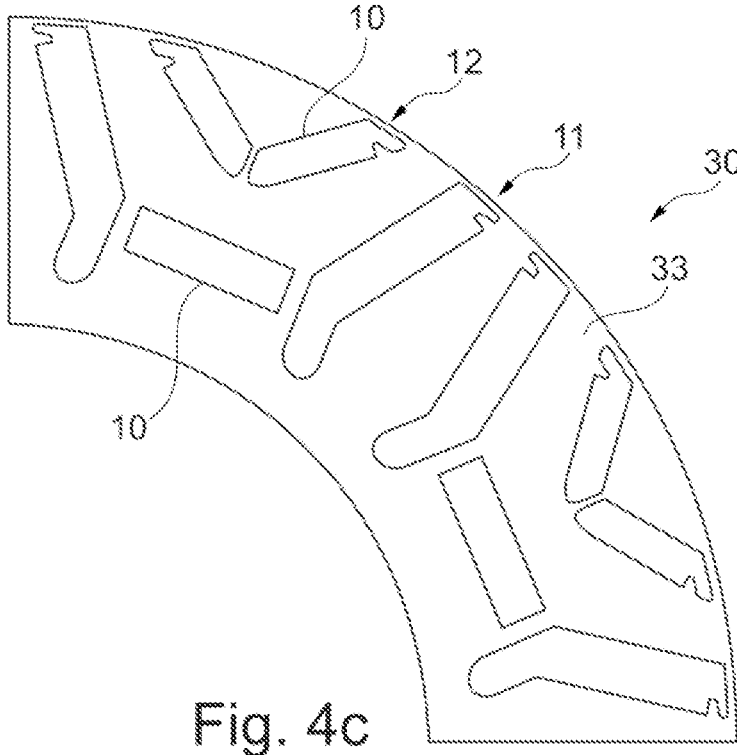
FIG. 4c is a view similar to FIG. 2 of an alternative embodiment.

In the example of FIG. 4c, the notches 15 of the recesses of the first row 12 are on the contrary elongated, ending in a semi-circle.

Figure 4D:
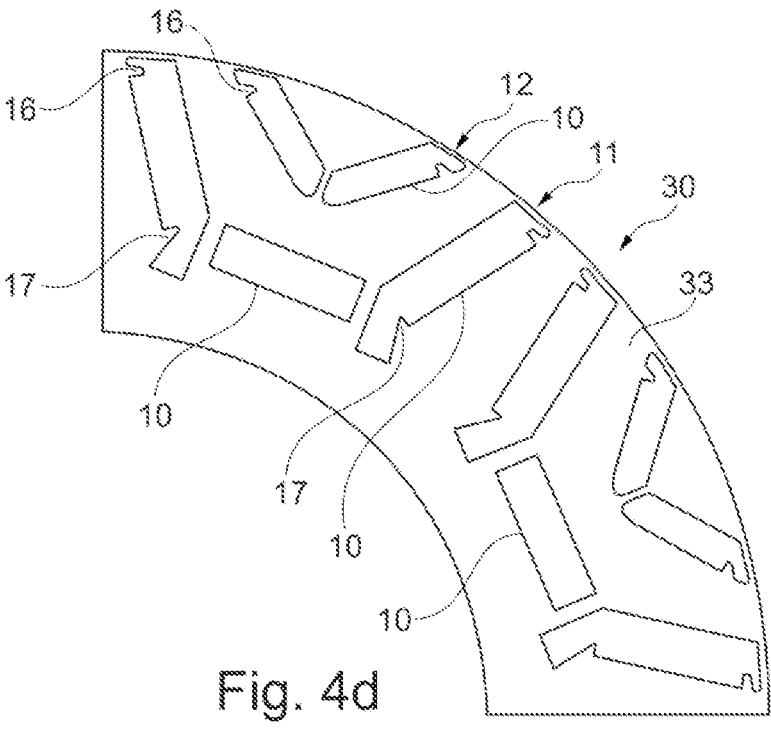
FIG. 4d is a view similar to FIG. 2 of an alternative embodiment.

In the example of FIG. 4d, the notches 15 of the recesses of the first row 12 are separated from the rest of the recesses by a stop 17 for holding the permanent magnet.

In the example embodiment of FIGS. 1 and 2, the side recesses of the first row 11 are provided with permanent magnets, as is the central recess, these magnets all being identical.

In the alternative embodiment shown in FIG. 5, the central recess of the first row 11 is provided with a permanent magnet smaller than the permanent magnets of the side recesses, of length L4 which is smaller than length L1 or length L2.

Alternatively, as shown in FIG. 6, the central recess of the first row may be empty, devoid of permanent magnet.

Figure 7A:
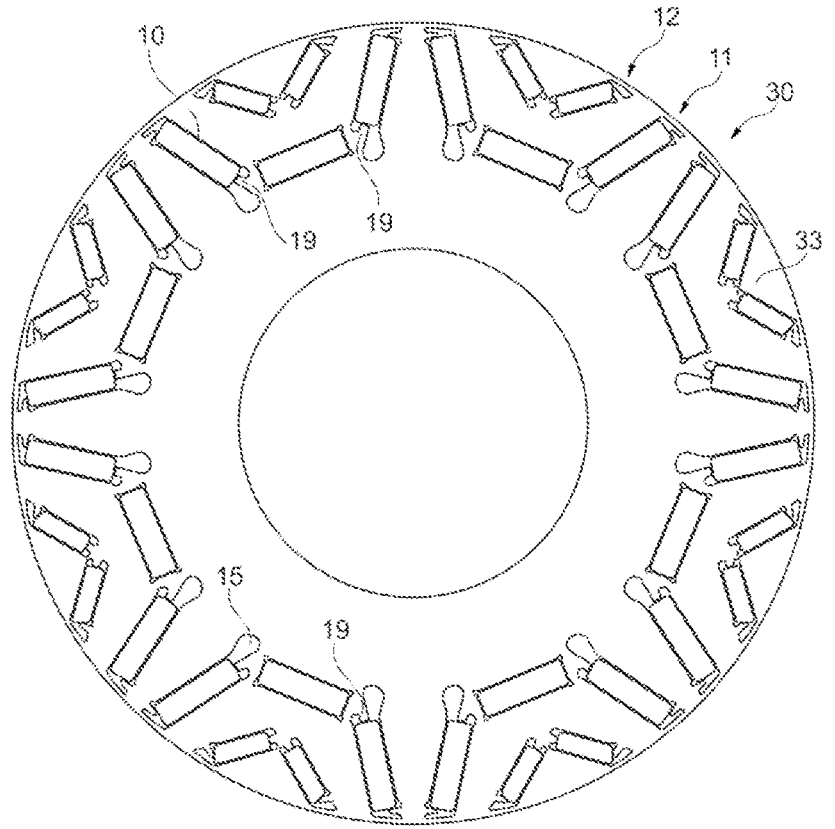
FIG. 7a is a view similar to FIG. 1 of an alternative embodiment.
Figure 7B:
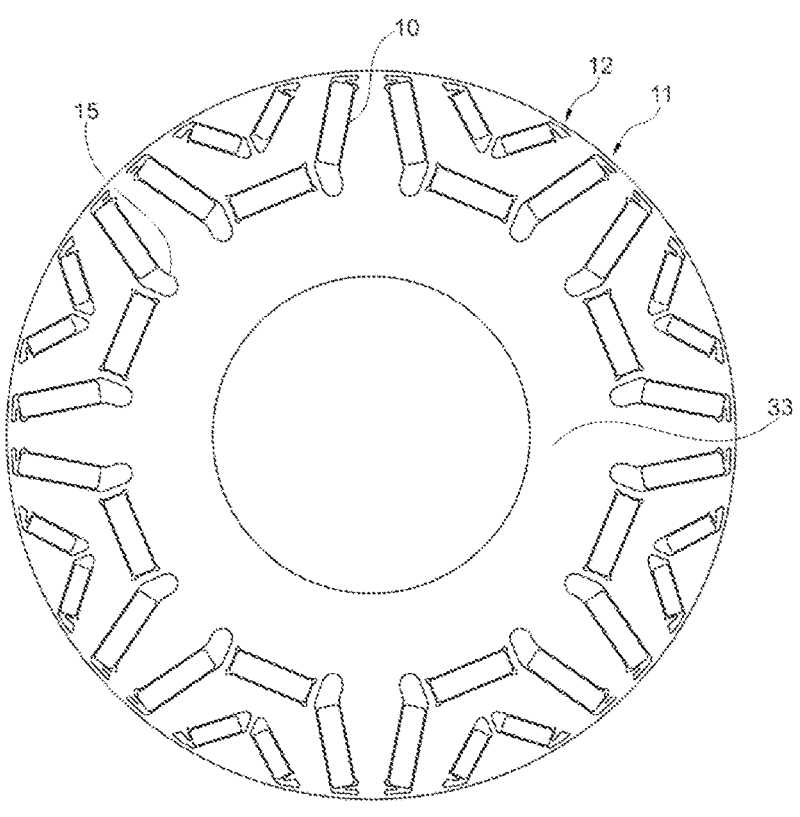

In the alternative embodiment shown in FIGS. 7a and 7b, certain laminations of the rotor comprise deformable tongues 19 which are each connected to a face of the corresponding recess, as shown in FIG. 7a, while other laminations of the stack do not comprise said tongues, as shown in FIG. 7b. In the example shown, only the side recesses of the first rows and the recesses of the second rows comprise such a deformable tongue 19.

The deformable tongues 19 each extend into the corresponding recess. Each deformable tongue 19 comprises a portion which is bent so as to press against a short side of the corresponding magnet. The bendable portion of the deformable tongue 19 is bent out of the plane of the laminations, along a bending axis of the deformable tongue 19 that extends in a plane parallel to the plane of the lamination.

In the examples described, the machine comprises 8 poles. Of course, it is not outside the scope of the present disclosure if the number of poles is different, for example, 6.

Figure 8A:
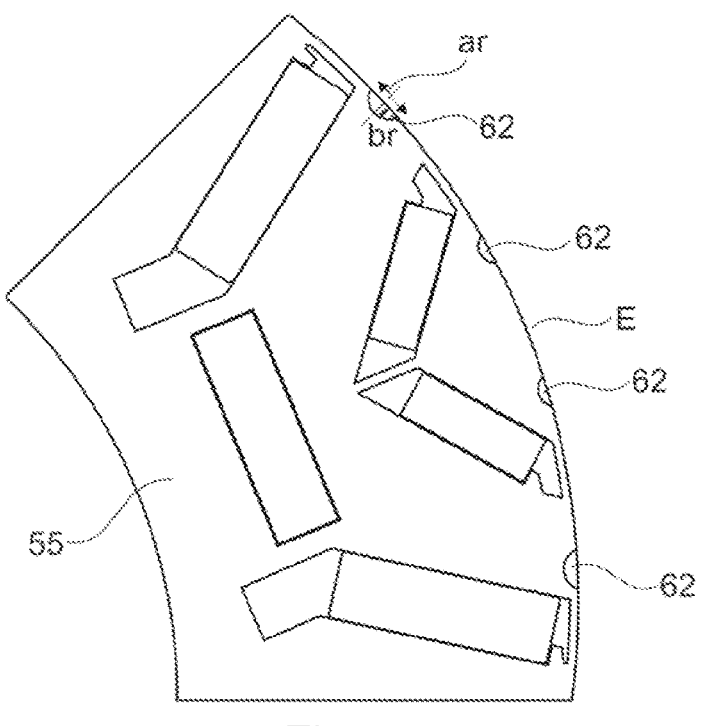
FIG. 8a is a schematic and partial view, in cross section, of an alternative rotor embodiment.

In an alternative embodiment shown in FIG. 8a, the laminations of the rotor body comprise indentations 62 on the surface of the rotor body facing the air gap E.

In this example, the indentations are partially elliptical in shape, with a depth br, measured radially in the plane of the lamination, greater than the width ar of the indentation 62, measured circumferentially in the plane of the lamination.

In the example of FIG. 8a, a pole of the rotor comprises four indentations 62 distributed symmetrically on either side of an axis of the pole.

In particular, when the indentations of a pole are not distributed symmetrically, the indentations of the laminations of a first stack of the rotor body are angularly offset relative to the indentations of the laminations of a second stack of the rotor body.

Figure 8B:
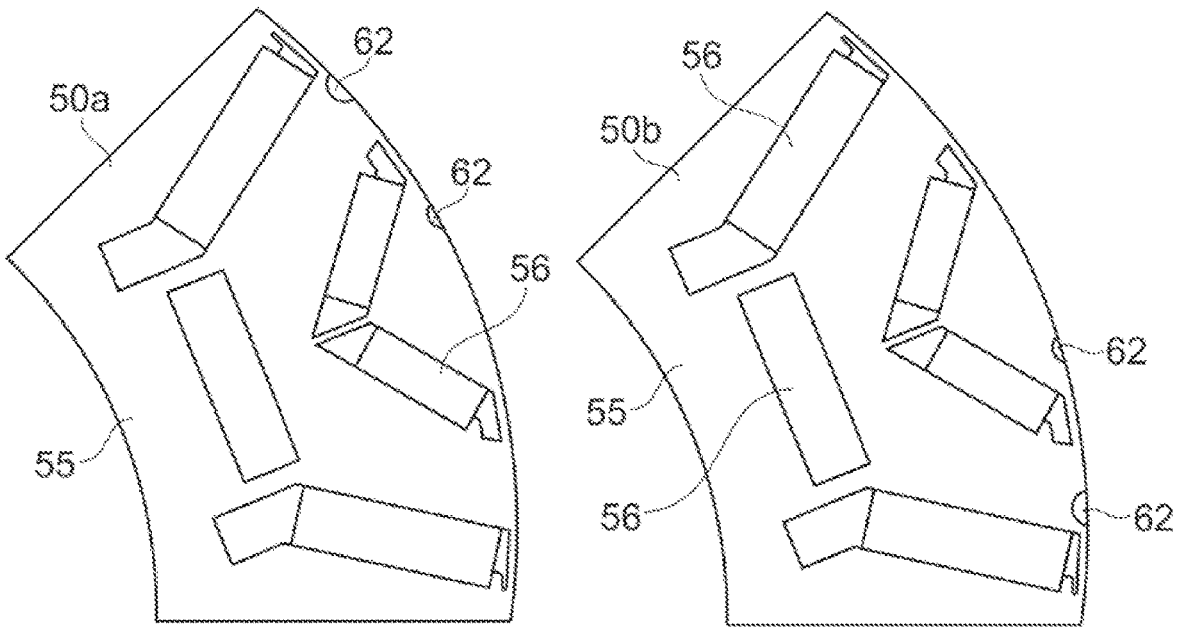
FIG. 8b is a schematic and partial view, in cross section, of a variant rotor embodiment.

As an example, FIG. 8b shows a rotor formed from two identical laminations turned over in order to form two stacks 50a, 50b of laminations each comprising two angularly offset indentations 62.

Figure 8C:
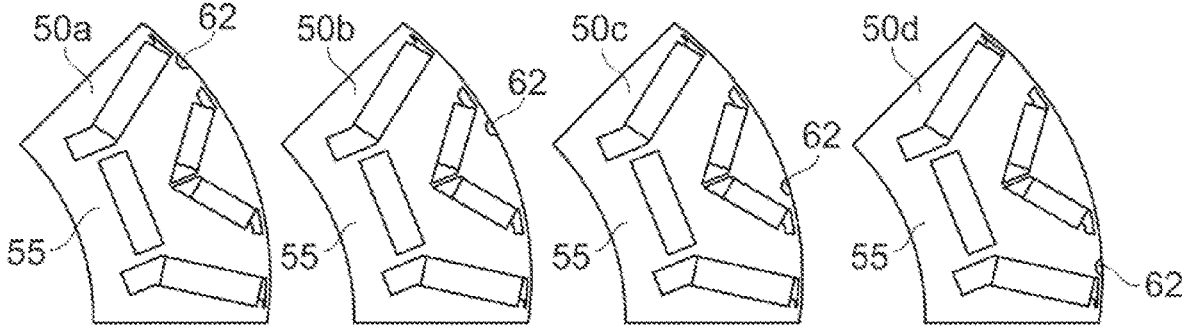
FIG. 8c is a schematic and partial view, in cross section, of a variant rotor embodiment.

In the example of FIG. 8c, the rotor comprises four stacks 50a, 50b, 50c, 50d, each comprising a single angularly offset indentation 62. The indentations 62 differ herein by their depth.

Of course, it is not outside the scope of the present disclosure if the rotor comprises a configuration that is different from those shown, for example by the number of stacks, the position of the indentations, or their shape or size.

The invention claimed is:

1. A rotor for a rotary electric machine, comprising a rotor body comprising laminations stacked on one another, the rotor body having a plurality of recesses, at least part of the recesses, or even all the recesses, accommodating one or more permanent magnets defining poles of the rotor,
    the recesses of a pole being arranged in at least a first and a second row of recesses,
    the first row of recesses comprising three recesses arranged in a U, with a central recess and two side recesses, a length (L2) of a larger rectangle enclosed in the central recess being equal to +/−20% of the length (L1) of the largest rectangle enclosed in a side recess,
    at least one of the side recesses comprising a notch that extends from the side recess toward the central recess, the notch being configured to protrude radially beyond the central recess,
    a ratio (B-A)/B being between 10% and 30%, wherein A is a width of a recess of the second row and B is a width of a central recess of the first row.

2. The rotor according to claim 1, the width (B) of the largest rectangle enclosed in the central recess being equal to +/−50% of the width (B) of the largest rectangle enclosed in a side recess.

3. The rotor according to claim 1, wherein the side recesses of the first row are provided with permanent magnets.

4. The rotor according to claim 1, the central recess of the first row being provided with a permanent magnet which is smaller than the permanent magnets of the side recesses.

5. The rotor according to claim 1, the recesses of the second row being arranged in a V.

6. The rotor according to claim 1, wherein an angular opening ($\alpha3$) of the second row is greater than or equal to twice the sum of the angular opening ($\alpha1$) between two consecutive poles and the angular opening ($\alpha2$) between the first and second rows.

7. The rotor according to claim 1, wherein an angular opening ($\alpha3$) of the second row is given by the following relationship: $\alpha3 = k2\pi/(2p)$, where p is the number of pairs of poles of the rotor and k is the polar opening coefficient, with the polar opening coefficient k which is comprised in the interval [22.5%; 37.5%].

8. The rotor according to claim 7, wherein the polar opening coefficient k is comprised in the interval [25%; 35%].

9. The rotor according to claim 1, an angle ($\alpha4$) between the adjacent recesses of two consecutive poles being strictly greater than 0.

10. The rotor according to claim 9, wherein the angle ($\alpha4$) between the adjacent recesses of two consecutive poles is between 5° and 35°.

11. The rotor according to claim 9, wherein the angle ($\alpha4$) between the adjacent recesses of two consecutive poles is between 12° and 30°.

12. The rotor according to claim 1, a width (X) of the notch being comprised between 0 mm and twice the width (B) of the central recess.

13. The rotor according to claim 1, a radial dimension (W) between the bottom of the second row and the first row being between once the width B of the central recess and three times said width.

14. The rotor according to claim 1, the notch having an edge that extends at least partially parallel to an edge of the central recess.

15. The rotor according to claim 1, at least one recess comprising at least one stop for holding the permanent magnet intended to be accommodated in the recess.

16. The rotor according to claim 1, being devoid of circulation of cooling fluid in the recesses.

17. A rotary electric machine, comprising a stator and a rotor as defined in claim 1.

18. A rotor for a rotary electric machine, comprising a rotor body comprising laminations stacked on one another, the rotor body having a plurality of recesses, at least part of the recesses, or even all the recesses, accommodating one or more permanent magnets defining poles of the rotor, the recesses of a pole being arranged in at least a first and a second row of recesses, the first row of recesses comprising three recesses arranged in a U, with a central recess and two side recesses, a length (L2) of a larger rectangle enclosed in the central recess being equal to +/−20% of the length (L1) of the largest rectangle enclosed in a side recess, at least one of the side recesses comprising a notch that extends from the side recess beyond the central recess, each side recess of the first row forming a material bridge with the central recess, the two material bridges each having a longitudinal axis, the two axes being parallel to one another, a ratio (B-A)/B being between 10% and 30%, wherein A is a width of a recess of the second row and B is a width of a central recess of the first row.

* * * * *